United States Patent [19]
Imai et al.

[11] Patent Number: 5,357,298
[45] Date of Patent: Oct. 18, 1994

[54] CAMERA

[75] Inventors: Toshihiko Imai; Mitsumasa Okubo; Yasushi Odanaka, all of Tokyo, Japan

[73] Assignee: Olympus Optical Co., Ltd., Tokyo, Japan

[21] Appl. No.: 961,457

[22] Filed: Oct. 15, 1992

[30] Foreign Application Priority Data

Oct. 15, 1991 [JP] Japan .................. 3-266486

[51] Int. Cl.⁵ .................. G03B 17/02; G03B 17/00
[52] U.S. Cl. .................. 354/159; 354/286
[58] Field of Search .................. 354/94, 99, 159, 286, 354/195.12

[56] References Cited

U.S. PATENT DOCUMENTS

| | | | |
|---|---|---|---|
| 4,275,953 | 6/1981 | Watanabe et al. | 354/286 |
| 4,963,918 | 10/1990 | Matsumoto et al. | 355/40 |
| 4,967,214 | 10/1990 | Taniguchi et al. | 354/79 |
| 5,066,971 | 11/1991 | Kodaira | 354/465 |
| 5,086,311 | 2/1992 | Naka et al. | 354/195.1 |
| 5,159,364 | 10/1992 | Tanagisawa et al. | 354/21 |
| 5,214,464 | 5/1993 | Karasaki et al. | 354/286 |

FOREIGN PATENT DOCUMENTS 14234 of 1961 Japan .
1-48054 of 1989 Japan .

*Primary Examiner*—Michael L. Gellner
*Assistant Examiner*—Nicholas Tuccillo
*Attorney, Agent, or Firm*—Louis Weinstein

[57] ABSTRACT

Disclosed is a camera loaded selectively with either a first film having perforations formed in side edges or a second film having the same width as that of the first film and no perforations formed in side edges. The camera comprises: a picture size changeover device for selectively setting a photographing picture frame to a first picture size corresponding to the first film and a second picture size corresponding to the second film; a first lens installable and removable in and from the camera and having an image circle corresponding to the first picture size; a second lens installable and removable in and from the camera and having an image circle corresponding to the second picture size; and a device for judging which lens, the first lens or the second lens, to install in the camera. When the judging device judges that the first lens is installed in a state where the picture size is set to the second picture size, the picture size is so set as to be forcibly changed over to the first picture size.

30 Claims, 10 Drawing Sheets

CAMERA

BACKGROUND OF THE INVENTION

1. Field of the Invention

The present invention relates generally to a camera and, more particularly, to a camera in which a picture size is changed over in accordance with a magnitude of an image circle of a photographing lens to be installed.

2. Related Art Statement

The present inventor previously proposed, to the Japanese Patent Office, cameras which are, as disclosed in Japanese Patent Application Nos. 200877/1991 and 201969/1991, adapted to change over a photographing picture size and capable of photographing with a photographing picture larger than the current JIS-135 type film having perforations by use of a film with no perforation (hereinafter called an S-format film) for the purpose of improving picture quality thereof, i.e., this film being conceived as a roll film which employs the current JIS-135 type film and a Patrone of this current JIS-135 type film.

In these cameras, an existence or non-existence of the perforations of the film loaded in a camera body is detected by a perforation detecting means or the like. If the perforations exist in the film, a mask plate for setting the photographing picture size is moved inwardly of the same perforations by a mask plate driving means. Photographing is thus effected with the convectional standard photographing picture size. If no perforations exist in the film, the mask plate for setting the photographing picture size is located outwardly of a portion corresponding to the same perforations by the same mask plate driving means. The photographing can be performed with a photographing picture size larger than the standard size described above.

Then, it is thus possible to reduce an enlargement ratio during printing by enlarging the photographing picture by use of a film from which the perforations of the JIS-135 type film are eliminated. A high quality print picture can be also obtained.

By the way, the photographing picture size changeover camera disclosed in Japanese Patent Application No. 200877/1991 was proposed on the premise that the lens is not interchanged as in the case of, e.g., a compact camera. A photographing lens designed to have an image circle larger than the conventional one is previously installed in the camera body. Both photographing based on the ordinary picture size and photographing based on a picture size larger than the ordinary picture size are attainable.

However, when the S-format film having the large picture size is applied to a single-lens reflex camera, the following inconveniences arise.

As is known well, in contrast with the compact camera, the single-lens reflex camera provides a facility to the user by making usable a variety of interchangeable lenses having a compatibility. Hence, the conventional photographing lens is installed in the camera body in which the photographing lens having the image circle larger than that of the conventional photographing lens is installable. The photographing is effected in a state where picture size larger than the conventional standard picture size is set. In such a case, there is a remarkable decline in quality of an image of the image circle which covers the conventional picture size.

This trouble is caused due to an omission to switch over setting of the picture size to the conventional standard picture size on the occasion of installing the photographing lens having an image circle larger than that of the conventional photographing lens to perform photographing with the large picture size and next interchanging it to a photographing lens having a smaller image circle.

On the other hand, Japanese Patent Publication No. 14234/1961 discloses a technical means for simultaneously changing over both the photographing picture size by using a mask plate and the finder window. According to this technical means, in the same camera, the photographing operation is performed by changing a magnitude of the photographing picture size on demand with a manipulation from the outside of the camera body in accordance with a purpose of the photographing. An interval between the respective photographing pictures is thereby kept constant. In addition, the magnitude of the photographing picture size is displayed in the finder window. This technical means does not, however, imply that the photographing picture size varies corresponding to a difference between the image circles.

Proposed further in Japanese Patent Laid-Open No. 48054/1989 is a picture size changeover camera constructed to prevent an erroneous change in the film wind quantity per frame in the midst of photographing which uses the same roll film. This camera does not, however, imply that the photographing picture size varies corresponding to a difference between the image circles.

OBJECTS AND SUMMARY OF THE INVENTION

It is a first object of this invention to provide a camera loaded selectively with a first film having perforations formed in side edges and a second film having the same width as that of the first film and no perforations formed in side edges to change over a first picture size corresponding to the first film and a second picture size corresponding to the second film, the camera being characterized in that if it is judged on the side of the camera body that the second lens having an image circle corresponding to the second picture size is not installed in the camera body in a state where the picture size is set to the second picture size, the picture size is so set as to be forcibly changed over to the first picture size.

It is a second object of this invention to provide a camera loaded selectively with a first film having perforations formed in side edges and a second film having the same width as that of the first film and no perforations formed in side edges to change over a first picture size corresponding to the first film and a second picture size corresponding to the second film, the camera being characterized in that if it is judged on the side of the camera body that the second lens having an image circle corresponding to the second picture size is not installed in the camera body in a state where the picture size is set to the second picture size, the photographer can be visually informed of the fact that photographing based on the second picture size is inhibited through a finder field frame possible of switchover.

It is a third object to provide a camera capable of obtaining a high quality picture over the film surface by forcible setting to change over the picture size to a smaller picture size when effecting the photographing in a state where a conventional photographing lens having a smaller image circle is installed in the camera body, and a larger picture size is set on the side of the camera body.

It is a fourth object of this invention to provide a camera capable of visually informing the photographer of the fact that photographing based on the larger picture size is inhibited through the finder field frame possible of switchover when performing the photographing in a state where the conventional photographing lens having the smaller image circle is installed in the camera body, and the larger picture size is set on the side of the camera body.

It is a fifth object of this invention to provide a camera loaded selectively with a first film having perforations formed in side edges and a second film having the same width as that of the first film and no perforations formed in side edges to change over a first picture size corresponding to the first film and a second picture size corresponding to the second film, the camera being characterized in that if it is judged on the side of the camera body that the second lens having an image circle corresponding to the second picture size is not installed in the camera body in a state where the picture size is set to the second picture size, the film is fed in accordance with the second picture size.

Briefly, according to the present invention, there is provided a camera loaded selectively with a first film having perforations formed in side edges and a second film having the same width as that of the first film and no perforations formed in side edges, the camera comprising: the picture size changeover means for selectively setting the photographing picture frame to the first picture size corresponding to the first film and the second picture size corresponding to the second film; a first lens installable and removable in and from the camera and having an image circle corresponding to the first picture size; a second lens installable and removable in and from the camera and having an image circle corresponding to the second picture size; and the means for judging which lens, the first lens or the second lens, to install in the camera, whereby when the judging means judges that the first lens is installed in a state where the picture size is set to the second picture size, the picture size is so set as to be forcibly changed over to the first picture size.

These as well as other objects and advantages of the present invention will become further apparent from the following detailed explanation.

DETAILED DESCRIPTION OF THE PREFERRED EMBODIMENTS

Embodiments of the present invention will be described hereinbelow with reference to the drawings.

Figure 1:
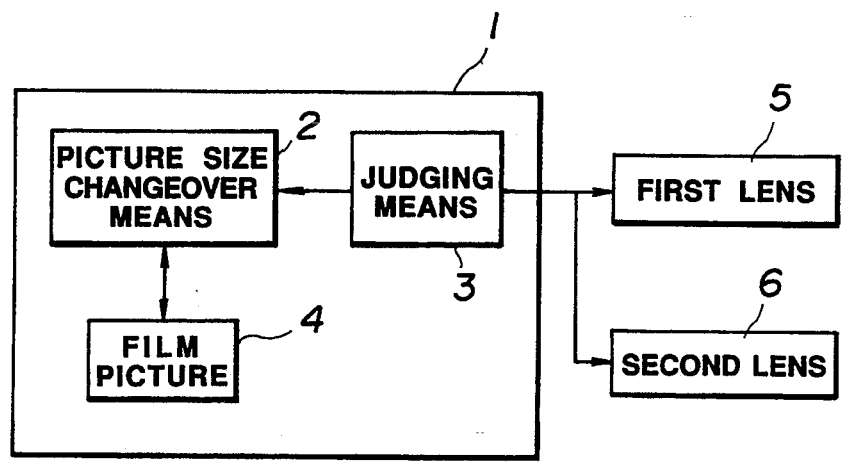
FIG. 1 is a block diagram of a construction of a camera, showing a concept of the present invention.

As illustrated in a conceptual diagram of FIG. 1, a camera in accordance with a first embodiment of the present invention has a camera body 1. Installable in the camera body 1 is any one of a photographing lens (hereinafter referred to as a first lens) 5 having an image circle of a conventional standard size and a photographing lens (hereinafter called a second lens) 6 having an image circle larger than that of the first lens. The camera body 1 incorporates: a judging means 3 for detecting whether the first lens or the second lens has been installed; and a picture size changeover means 2 for setting a picture size of a film picture 4 to a conventional standard picture size (hereinafter referred to as a first picture size) on the basis of a judging signal of the judging means when the first lens has been installed and setting the picture size of the film picture 4 to a picture size (hereinafter called a second picture size) larger than the first picture size when the second lens has been installed.

The action of the camera in accordance with the first embodiment will be briefly explained. In a state where the picture size is set to the second picture size, if the judging means 3 judges that the lens installed in the camera body 1 is identical with the first lens 5, the picture size is so set as to be forcibly changed over to the first picture size.

Figure 2:
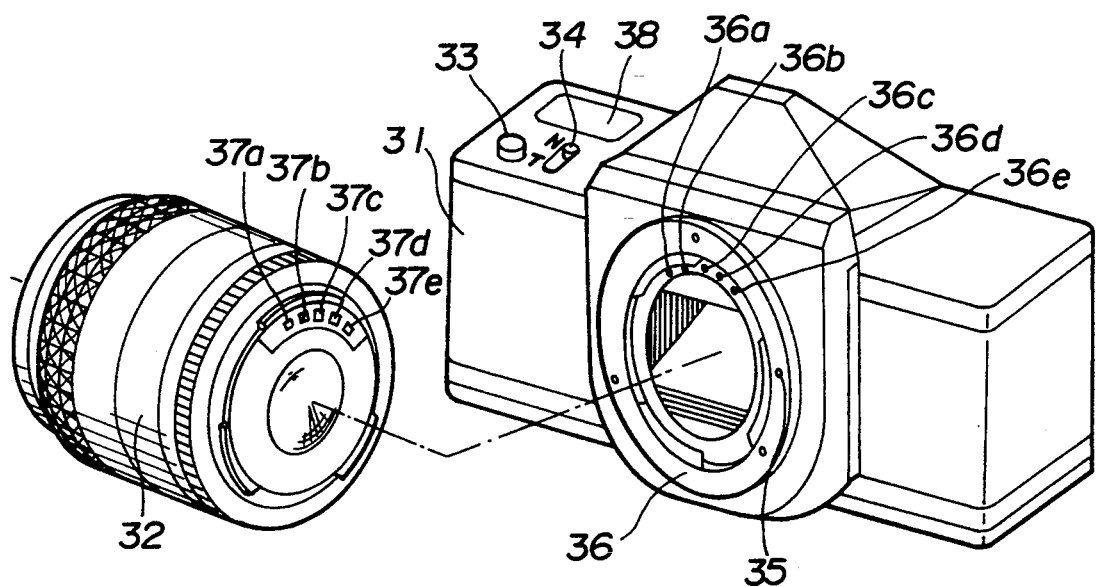
FIG. 2 is a perspective view of an appearance of the camera, showing a first embodiment of the present invention.

FIG. 2 is a perspective view of an appearance of the camera of the first embodiment, depicting a state where the photographing lens is removed from the camera body of a single-lens reflex camera.

As illustrated in FIG. 1, this camera principally comprises: a camera body 31; a release button 33 disposed one-sidedly on the upper surface of the camera body 31; a photographing picture size changeover switch 34 disposed in the vicinity of this release button 33: a liquid crystal display unit 38, disposed in rear of the photographing picture size changeover switch 34, for changing over an indication on the basis of a status of the same changeover switch 34; a photographing lens mount unit 36 disposed at the center of the front surface of the above-mentioned camera body 31; and a photographing lens 32 attachably/detachably installed in this photographing lens mount unit 36. Further, a photographing lens installation detecting unit 35 for detecting that the photographing lens 32 has been installed is provided on a part of the front surface of the photographing lens mount unit 36. When the photographing lens 32 is installed, the installation detecting unit 35 is intruded, and an installation confirming signal is transmitted to a CPU 101 (see FIG. 8) within the camera body 31.

Further, electric contact point groups 36a–36e and 37a–37e are provided on the photographing lens mount unit 36 and on a part of the confronting surface of the photographing lens 32. The electric contact groups contact each other when the photographing lens 2 is installed in the camera body 31. The camera body 31 is thus electrically connected to the photographing lens 32. More specifically, according to this electric connection mode, the camera body 31 incorporates a power supply unit (unillustrated). A voltage of the power supply is supplied also to the photographing lens 32, with the electric contact point 36a serving as a Vcc electrode and the electric contact point 36e serving as a GND electrode. In addition, the electric contact points 36b, 37b are employed as bidirectional information communications contact points. The electric contact points 36c, 37c are used as bidirectional information contact points. The electric contact points 36d, 37d are employed for determining communicating directions of the bidirectional information communications.

Figure 3:
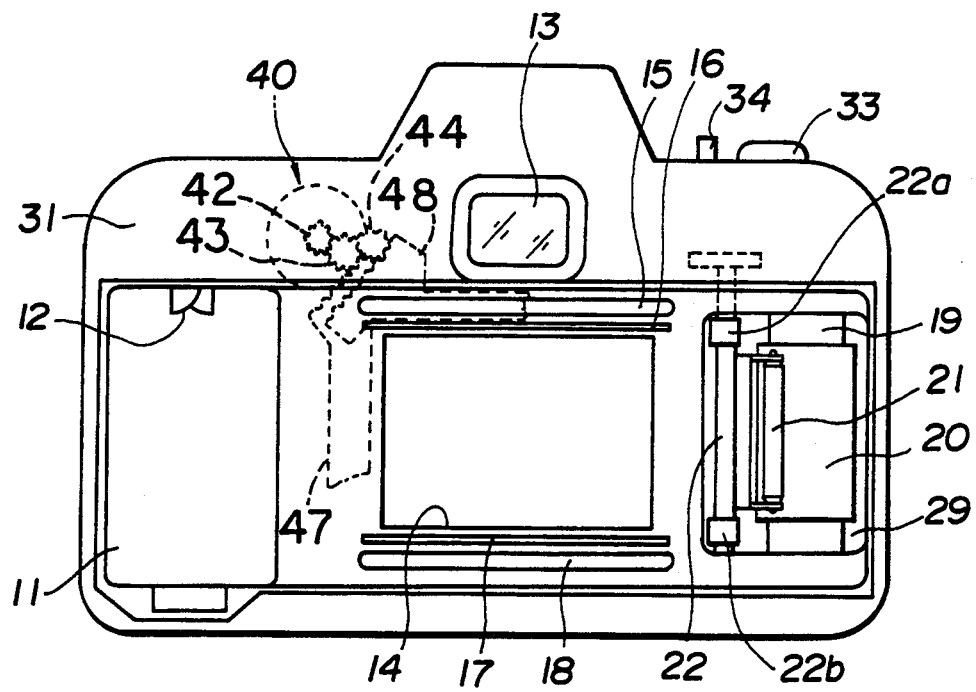
FIG. 3 is a rear view illustrating the camera of the first embodiment.

FIG. 3 is a rear view illustrating the camera in the first embodiment, with a rear cover being removed.

As depicted in FIG. 3a, a Patrone loading chamber 11 conceived as a film supply chamber is capable of loading a film Patrone which accommodates the above-mentioned S-format film or a current 135-type film. A fork 12 for winding the film Patrone by an electromotive force is provided at a ceiling wall of the Patrone loading chamber 11. The fork 12 is driven by a motor (unillustrated). A finder eyepiece 13 is disposed at the upper central part of the rear surface of the camera body 31. The finder eyepiece serves as an eyepiece of a finder optical system 70 (see FIG. 5) which will be mentioned later.

Then, a mask unit 14 defined as a photographing picture range is formed on the central rear side of the camera body 31. The mask unit 14 is larger than the first picture size described above, wherein, for instance, the height dimension h=29 mm, and the width dimension w=40.75 mm. With these dimensions, an aspect ratio of the photographing picture is set to 1:√2 so that the photographing picture is pursuant to the ISO standard and analogous to the A-format paper size. Further, a length of diagonal line of the photographing picture is approximately 50.0 mm because of the dimensions being set as described above. This is longer than the diagonal line length, approximately 43.3 mm, of the conventional photographing picture.

Note that in this embodiment, as explained above, the photographing picture size is set to obtain the aspect ratio of 1:√2 so that the photographing picture becomes analogous to the A-format paper size. This set value is not, however, limited to the above-mentioned ratio. For example, there may be adopted aspect ratios to assume analogs to paper sizes such as a letter size, legal size, etc. which are generally employed in the U.S. or paper sizes used in other foreign countries.

A photographing picture mask changeover mechanism 40 (see FIG. 4) which will be explained hereinbelow is disposed inwardly of the mask unit 14, whereby the photographing picture is changed over.

Further, film rails 15, 16, 17, 18 are laid in a film feeding direction in upper and lower positions of the mask unit 14. The external film rails 15, 18 are flush in terms of rail surfaces thereof with the internal film rails 16, 17.

Moreover, a film wind chamber 29 is disposed on the opposite side of the Patrone loading chamber 11, with the mask unit 14 being interposed therebetween. The film wind chamber 29 incorporates a film wind spool shaft 19 of the same type as that of an ordinary camera. Further, the central part of this spool shaft 19 is wound with a rubber belt 20 having a large frictional force for securing film loading even in the case of an unperforated film.

Besides, the rubber belt 20 of the spool shaft 19 is equipped with an auxiliary roller 21 supported on an auxiliary roller arm having its proximal ends slidably attached to the camera body 31 so that the roller surface thereof contacts the surface of the rubber belt 20. This auxiliary roller 21 performs a function to help the film loading of the spool shaft 19 when loading the charged film with rotations of the spool shaft 19.

A film feed quantity detection roller shaft 22 is disposed by the side of this auxiliary roller 21 in parallel with the spool shaft 19 in a position closer to the mask unit 14. Detection rollers 22a, 22b formed of rubber exhibiting a large frictional force are respectively fitted to the upper and lower parts of this film feed quantity detection roller shaft 22. These detection rollers 22a, 22b rotate interlocking with the film loading on contacting the internal upper and lower ends of the film when this film is loaded.

Hence, the film feed quantity detection roller shaft 22 makes rotations corresponding to a film feed quantity. Then, a rotary plate of a pulse generating mechanism for detecting a film feed quantity is fixed to an upper shaft portion, extending into the camera body 31, of the same detection roller shaft 22. Generated thereby is a pulse signal corresponding to a rotary quantity of the film feed quantity detection roller shaft 22. It is therefore possible to measure the film feed quantity in the CPU 101 (see FIG. 8).

Figure 4:
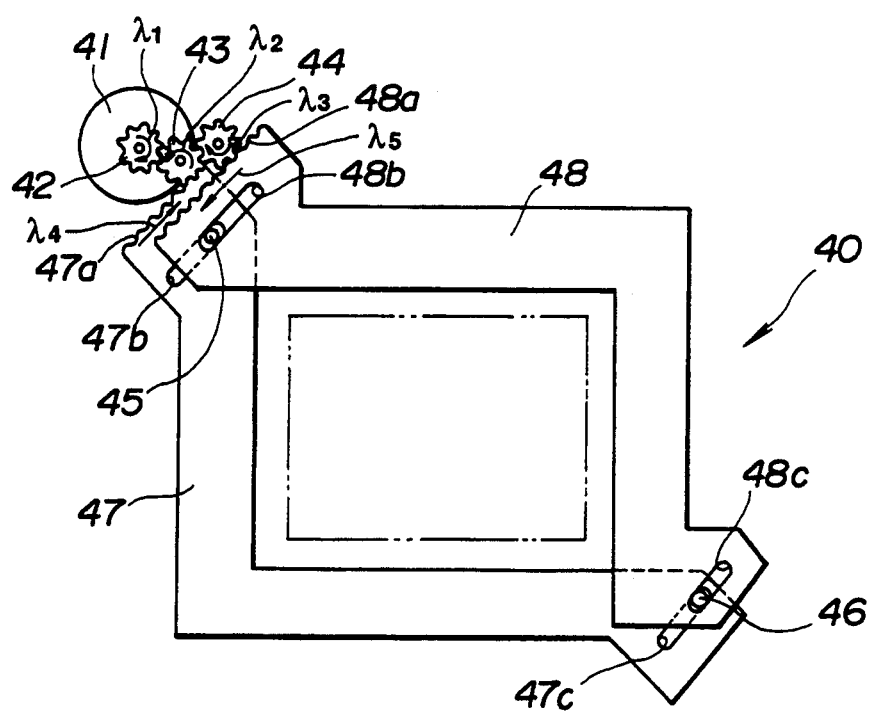
FIG. 4 is a front elevation depicting a photographing picture mask changeover mechanism in the camera of the first embodiment.

FIG. 4 is a view illustrating a construction of the photographing picture mask changeover mechanism 40. This mask changeover mechanism 40 is incorporated into the camera body 31 and works to change over sizes of masks of a large picture (the second picture size) and of an ordinary picture (the first picture size) by operating a picture size changeover motor 41.

Figure 8:
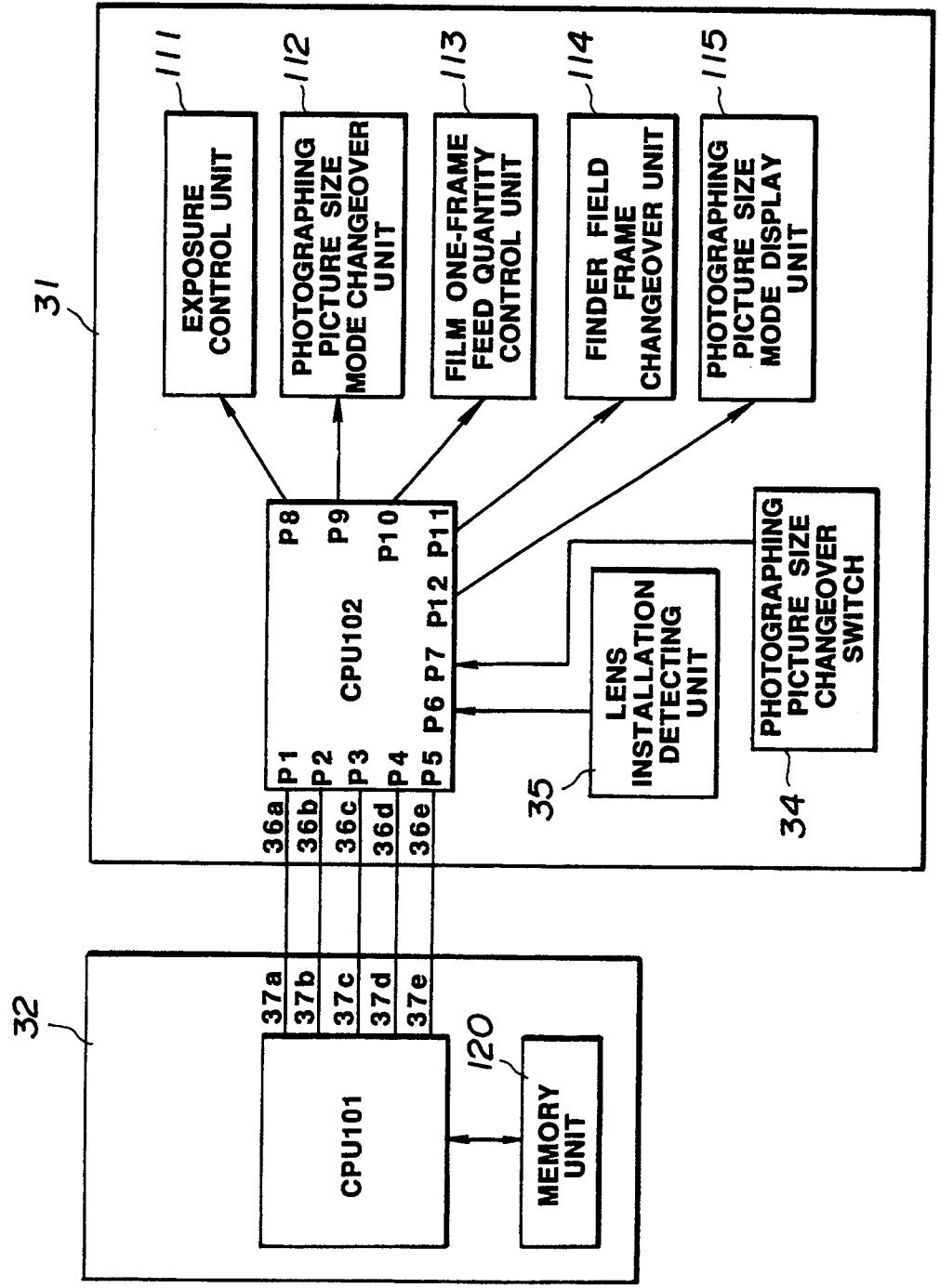
FIG. 8 is an electric circuit block diagram illustrating the construction of CPUs for controlling the operations of the camera and a peripheral circuit thereof in the first embodiment.

Rotations of the picture size changeover motor 41 are controlled by a picture size changeover motor driving circuit (not shown) which operates in accordance with a command of the CPU 101 (see FIG. 8). A pinion 43 rotatably engages with an output gear 42 of this changeover motor 41. Further, a pinion 44 rotatably meshes with this pinion 43. Mask frames 47, 48, which are so formed opposite to each other as to configure L-shaped frame plates and are switch-driven by the pinions 43, 44, move in the directions of diagonal lines to each other.

To be specific, both ends of the two masks 47, 48 extend in the directions of diagonal lines to each other. Racks 47a, 48a are formed in masks 47 at the edges extending upwards. Then, these two racks 47a, 48a respectively engage with the pinions 43, 44. Further, guide slits 47b, 48b and 47c, 48c are formed in the extended portions of racks 47, 48 in the directions of diagonal lines. Guide pins 45, 46 are fitted in the respective guide slits.

In the thus constructed photographing picture mask changeover mechanism 40, when the picture size changeover motor 41 rotates in an arrowed direction λ1, the pinions 43, 44 rotate in arrowed directions λ2, λ3, respectively. The racks 47a, 48a of the mask frames 47, 48 move in arrowed directions λ4, λ5. With these movements, the mask frames 47, 48 mutually move inwards, thereby narrowing an intra-frame area down to a mask frame of the ordinary picture size (the first picture size). Further, when the picture size changeover motor 41 rotates in a direction reverse that of the arrowed direction λ1, the mask frames 47, 48 move in the direction reverse to the above-mentioned one, i.e., in such a direction as to enlarge the intra-frame area. A mask of the large photographing size (the second picture size) is thus formed.

Figure 5:
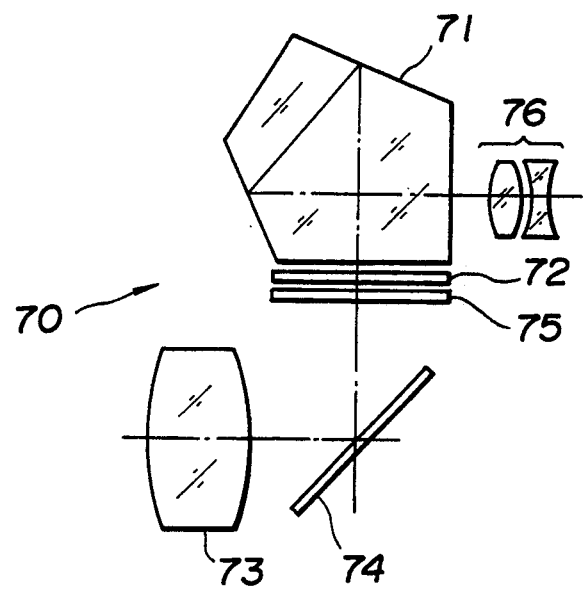
FIG. 5 is a side view illustrating a finder optical system employed in the camera of the first embodiment.

FIG. 5 is a side elevation illustrating a construction of a finder optical system 70 capable of changing over a field frame.

Figure 6A:
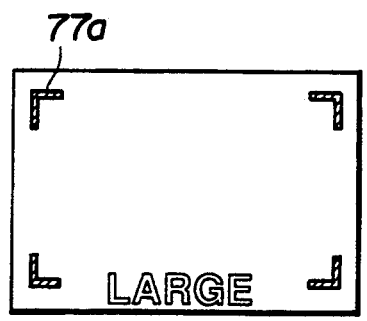
FIG. 6A is a view showing a display example during photographing of a large picture (a second picture size) of a finder field frame in the camera of the first embodiment.
Figure 6B:
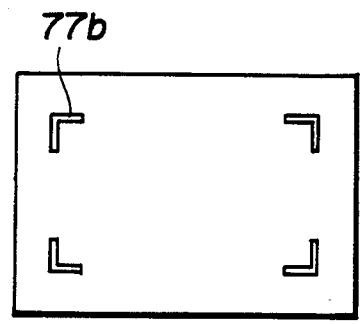
FIG. 6B is a view showing a display example during photographing of an ordinary picture (a first picture size) of the same finder field frame.

This finder optical system is constructed of a photographing lens 73, a movable mirror 74, a transmission type liquid crystal plate 72, a focusing plate 75, a pentaprism 71 and an eyepiece lens group 76. The transmission type liquid crystal plate 72 is interposed between an incident surface of the pentaprism 71 and the focusing plate 75, whereby changeovers in sizes of the second picture size field frame and of the first picture size field frame can be electrically displayed. Displayed as illustrated respectively in FIGS. 6A and 6B are a field frame 77a in the case of the large picture (the second picture size) due to liquid crystal plate 72 and a field frame 77b in the case of the ordinary picture (the first picture size).

Figure 7A:
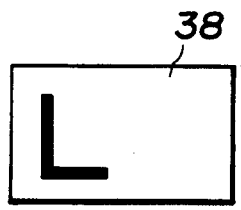
FIGS. 7A and 7B are plan views showing one display example of a liquid crystal display unit in the camera of the first embodiment.
Figure 7B:
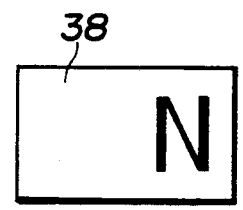

Further, FIGS. 7A and 7B are plan views showing a display example of a liquid crystal display unit 38 (see FIG. 2).

As explained earlier, the indication on this liquid crystal display unit 38 interlocks with the photographing picture size mode changeover switch 34. When the switch 34 is in an "L" or "N" state, the indication on the display unit 38 is changed over as shown in FIGS. 7A and 7B.

FIG. 8 is an electric circuit block diagram showing constructions of the CPU 102 on the side of the camera body, a CPU 101 on the side of a photographing lens barrel and a peripheral circuit thereof.

The camera body 31 incorporates the CPU 102 defined as a controller for controlling the electric circuit of the camera. Terminals P1–P5 of the CPU 102 are connected to the CPU 101 provided in the photographing lens 32 respectively via the electric contact point groups 36a–36e and 37a–37e. Further, in the CPU 102, the photographing lens installation detecting unit 35 and the photographing picture size changeover switch 34 are connected respectively to input terminals P6, P7, thereby constantly monitoring signals inputted. When predetermined signals are inputted to these input terminals, the operations corresponding thereto are performed (this will be stated later).

In addition, a memory unit for storing information indicating that the image circle is large is connected to the CPU 101 of the lens having a large image circuit. Note that this memory unit 120 stores whether the image circle is large or small per photographing lens. This may be transferred to the camera body 31.

Connected further to terminals P8–P12 of the CPU 102 are an exposure control unit 111, a photographing picture size mode changeover unit 112, a film feed quantity control unit 113, a finder field frame changeover unit 114 and a photographing picture size mode display unit 115. These units are controlled based on signals transmitted from the photographing lens installation detecting unit 35 and the photographing picture size changeover switch 34.

Herein, the operations of the CPUs 101, 102 will be briefly explained.

To start with, when the CPU 102 on the side of the camera body 31 reads a lens installation signal given from the photographing lens installation detecting unit 35, a command for distinguishing whether or not the installed photographing lens is identical with the second lens is transmitted by the installed photographing lens to the CPU 102 on the side of the camera 31. The CPU 101 receiving this transmitted signal transmits, to the CPU 102, a response signal indicating whether the installed photographing lens is identical with the first lens or the second lens. At this moment, if the CPU 101 is arranged to transmit the response signal only when the installed photographing lens is identical with the second lens, the CPU 102 is capable of distinguishing a type of the installed photographing lens, i.e., whether this is the first or second lens in accordance with an existence or non-existence of the response signal.

Further, the CPU 102 distinguishes a photographing picture size mode on the basis of a signal given from the photographing picture size changeover switch 34. Control signals corresponding to the information thereof are transmitted to the exposure control unit 111, the film feed quantity control unit 113, the photographing picture size changeover unit 112, the finder field frame changeover unit 114 and the photographing picture size mode display unit 115.

Figure 9:
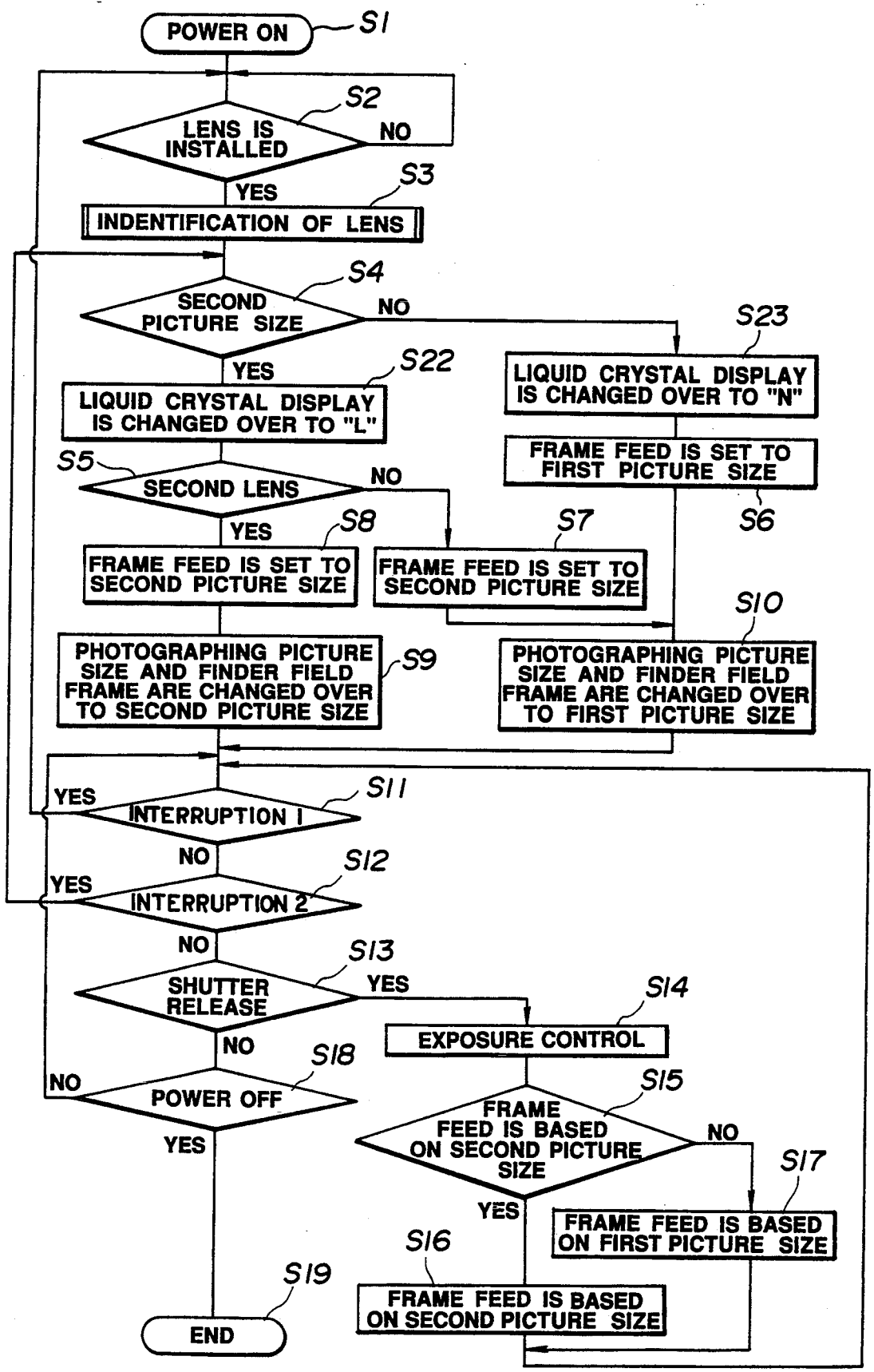
FIG. 9 is a flowchart showing the operations of the camera in the first embodiment.

Given next is an explanation of the operation of the camera in accordance with the first embodiment when distinguishing the type of the installed photographing lens 32 into the camera body 31 and the photographing picture size mode as well with reference to a flowchart of FIG. 9.

To begin with, when turning ON the power supply (step S1), the photographing lens installation detecting unit 35 judges whether the photographing lens is installed or not (step S2). If the photographing lens is not installed therein, the following reading process is not executed.

In step S2, if installed, the CPU 102 of the camera body 31 transmits a command to the CPU 101 of the photographing lens 32. A type of the installed photographing lens is distinguished based on the response signal thereof (step S3). Judged next is whether or not the photographing picture size relative to the photographing picture size changeover switch 34 is identical with the second picture size (step S4). Herein, if judged as the second picture size, the indication on the liquid crystal display unit 38 (see FIG. 7A) is changed over to "L" (step S22). Whether the installed photographing lens is identical with the second lens or not is judged (step S5). If judged as the second lens, there is read the process that the film feed quantity is set to the second picture size (step S8). The photographing picture size and the finder field frame size are changed over to the second picture size (larger than the ordinary size) (step S9).

If it is judged that the installed photographing lens is not identical with the second lens in step S5, there is read the process that the film feed quantity is set to the second picture size (step S7). The photographing picture size and the finder field frame are changed over to the first picture size (step S10).

If it is judged that the picture size is not the second picture size in step S4, the indication on the liquid crystal display unit 38 is switched over to "N" (step S23). Read is the process that film feed quantity is set to the first picture size (step S6). The photographing picture size and the finder field frame are switched over to the first picture size (step S10).

In the case of attaching and detaching the photographing lens 32 when turning ON the power supply (step S1) and changing over the picture size mode by use of the photographing picture size changeover switch 34, processes of an interruption 1 (step S11) and an interruption 2 (step S12) are therein executed each time. The operation returns to step S2 and step S4, wherein a rereading process is performed. If there is no interruption 1 (step S11) and interruption 2 (step S12), and when the shutter is released (step S13), an exposure is controlled (step S14). The film is fed with a film feed quantity which has already been read (steps S15, S16, S17). Thereafter, the operation goes back to step S11. If the shutter is not released in step S13, whether or not the power supply is turned OFF is judged (step S18). If not turned OFF, the operation returns to step S11. Whereas if turned OFF, the operation comes to an end (step S19).

The following is a detailed explanation of identification of the lens in step S3.

Figure 13:
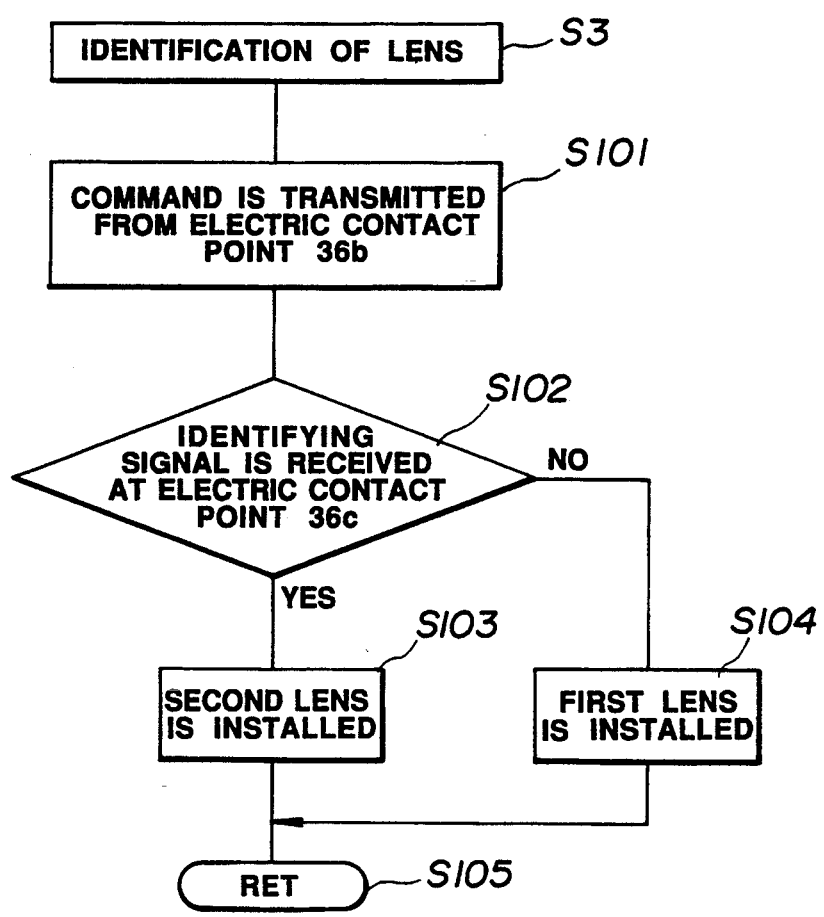
FIG. 13 is a flowchart showing subroutines for identifying lenses in the first embodiment.

FIG. 13 is a flowchart showing the lens identifying operation of the CPU 101 of the camera body 31.

At the first onset, the CPU 102 transmits, when the photographing lens 32 is installed in the camera body 31, a command to the photographing lens 32 from the electric contact point 36b (step S101). Judged then is whether or not an identifying signal from the photographing lens 32 is received at the electric contact point 36c (step S102). If there exists the identifying signal from the photographing lens 32 in this step S102, it is judged that the second lens is installed (step S103). When no identifying signal exists, it is judged that the first lens is installed (step S104). The actions are respectively returned to the main flow (step S105).

Figure 14:
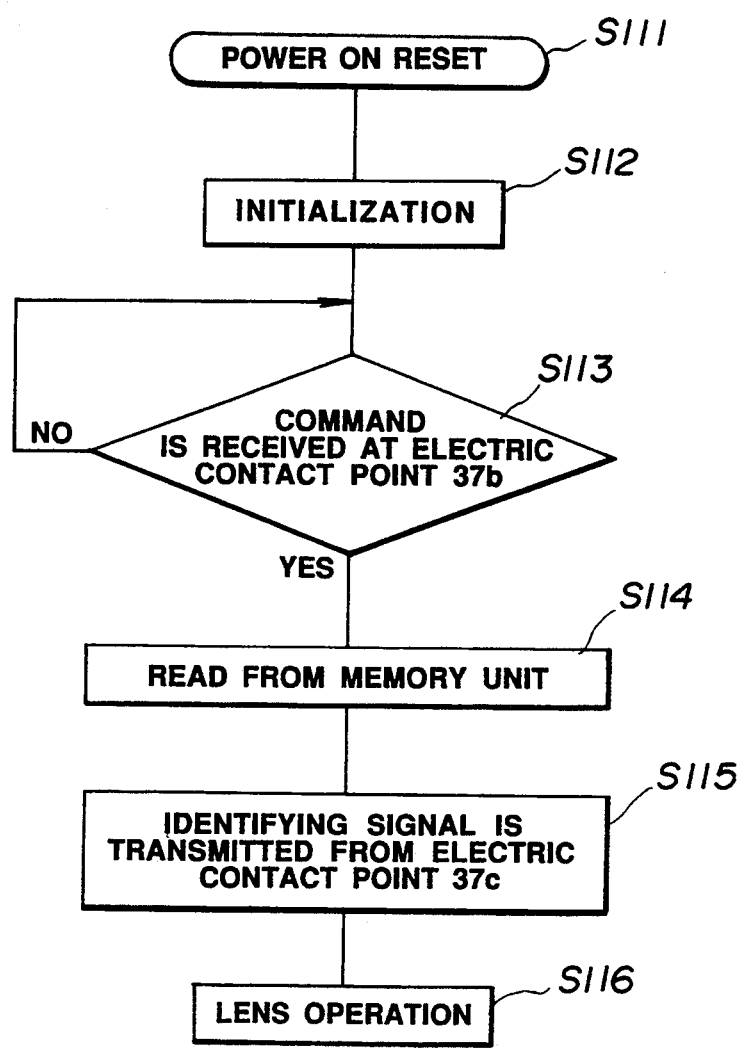
FIG. 14 is a flowchart showing subroutines on the side of the photographing lens in the first embodiment.

On the other hand, FIG. 14 is a flowchart showing the lens identifying operation of the CPU 101 of the photographing lens 32.

The CPU 101 is, upon installing the photographing lens 32 into the camera body 31, at first reset for power-ON (step S111). Subsequently, respective ports of the CPU 101 are initialized (step S112). Then, there is a wait till the above-mentioned command transmitted from the camera body 31 is received at the electric contact point 37b (step S13). When receiving the command in this step S113, the information is read from the memory unit 120 within the photographing lens 32 (step S114). So far as the installed photographing lens is identical with the second lens, the identifying signal is transmitted to the camera body 31 from the electric contact point 37c (step S115). Then, the lens operation is hereinafter effected (step S116).

If the installed photographing lens 32 is identical with the second lens from the above-mentioned result, two types of picture sizes, i.e., the first and second picture sizes, are selectable as photographing picture sizes. Further, if the installed photographing lens 32 is identical with the first lens, only the first picture size is selected. Even when the second picture size is selected, this selection is inhibited, with the result that a high quality picture can be obtained over the entire film surface. Additionally, the photographer can be visually informed of the fact that the second picture size photographing is inhibited through a finder field frame possible of switchover.

Further, though not illustrated, as another exemplification of the first embodiment, whether or not the installed photographing lens 32 is identical with the second lens is distinguished not by the electric identifying signal described above but by the following manner. A protrusion is formed on the lens mount unit of the photographing lens 32. At the same time, a lens type detecting unit for detecting the same protrusion is provided in a position, confronting the protrusion of the photographing lens 32, of the lens mount unit of the camera body 31. When installing the first lens and setting the photographing picture size changeover switch 34 to the second picture size, it will be therefore feasible to prevent the setting to the second picture size by use of a lever interlocking with the lens type detecting unit.

Figure 10:
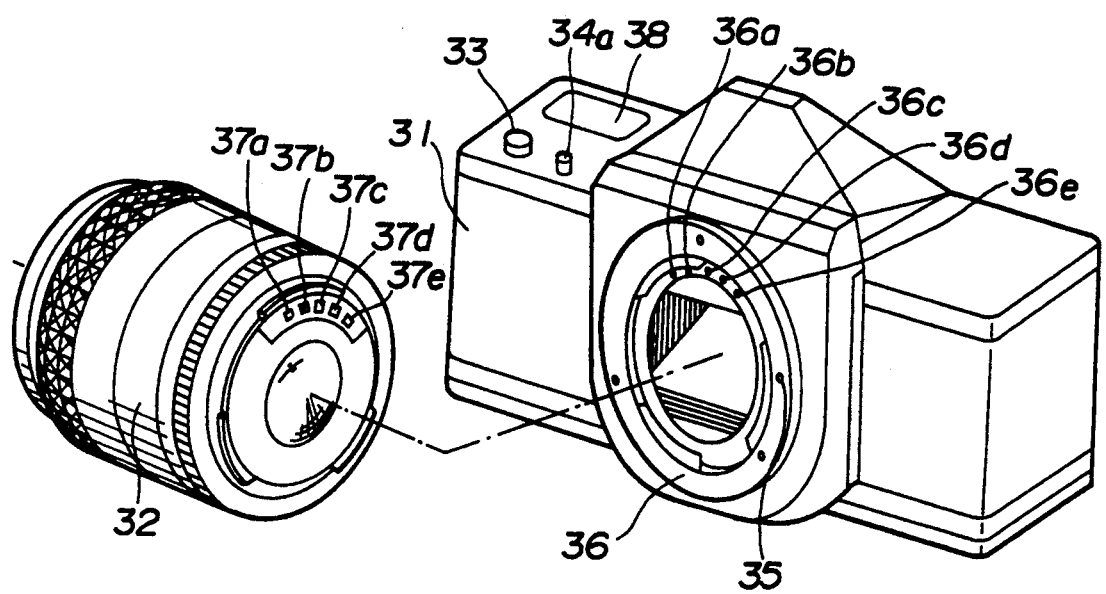
FIG. 10 is a perspective view of an appearance of the camera, showing a second embodiment of the present invention.

FIG. 10 is a perspective view of an appearance of the camera, demonstrating a second embodiment of the present invention.

In accordance with the second embodiment, the first and second picture sizes are changed over every time the photographing picture size changeover switch 34a is depressed by changing the constructed-of-lever photographing picture size changeover switch 34 in the first embodiment to a button-type photographing picture size changeover switch 34a. Other constructions and operations are the same as those in the first embodiment.

Figure 11:
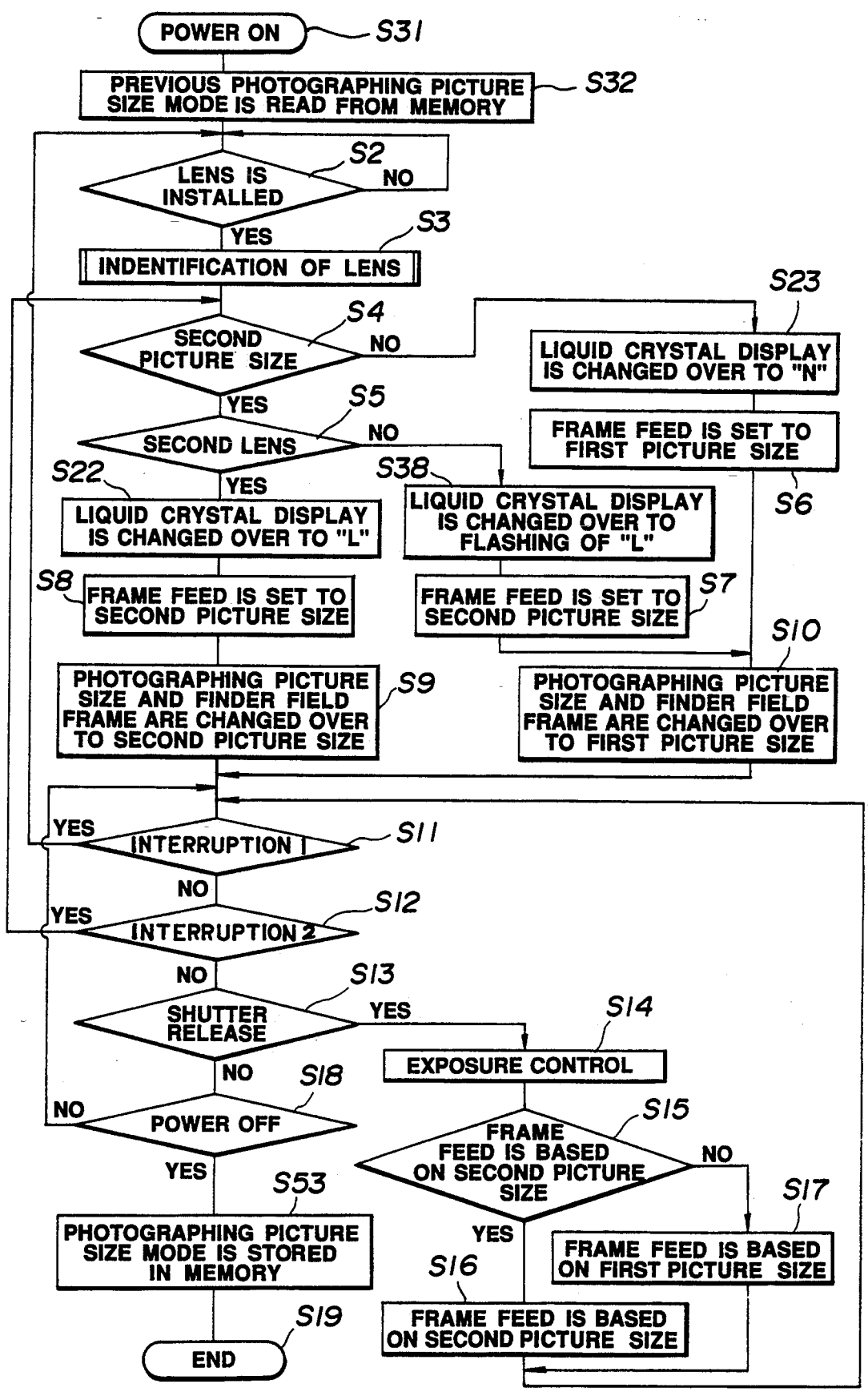
FIG. 11 is a flowchart showing the operations of the camera of the second embodiment.

Explained next is an operation of the camera in the second embodiment when identifying a type of the photographing lens 32 installed in the camera body 31 and a photographing picture size mode with reference to a flowchart of FIG. 11.

To start with, in this second embodiment, the photographing picture size when turning OFF the power supply last time is stored in the memory (step S53). When turning ON the power supply (step S31), the photographing picture size set last time is reread from the memory (step S32). The previously set photographing picture size is set as a photographing picture size when turning ON the power supply. Further, when the first lens is installed, and if the second picture size is selected, the indication "L" on the liquid crystal display unit 38 is flashed (step S38). The remaining steps in FIG. 11 are the same as those in the first embodiment.

As discussed above, in accordance with the second embodiment, for instance, if there exists a photographing picture size mode used by the photographer at a high frequency, so far as the photographing picture size changeover switch 34 is not depressed, one picture size continues to be kept, thus reducing a troublesomeness of the operation. Besides, the photographer can be informed of the fact that the photographing based on the second picture size is inhibited through flashing of the indication "L" on the liquid crystal display unit 38.

Figure 12:
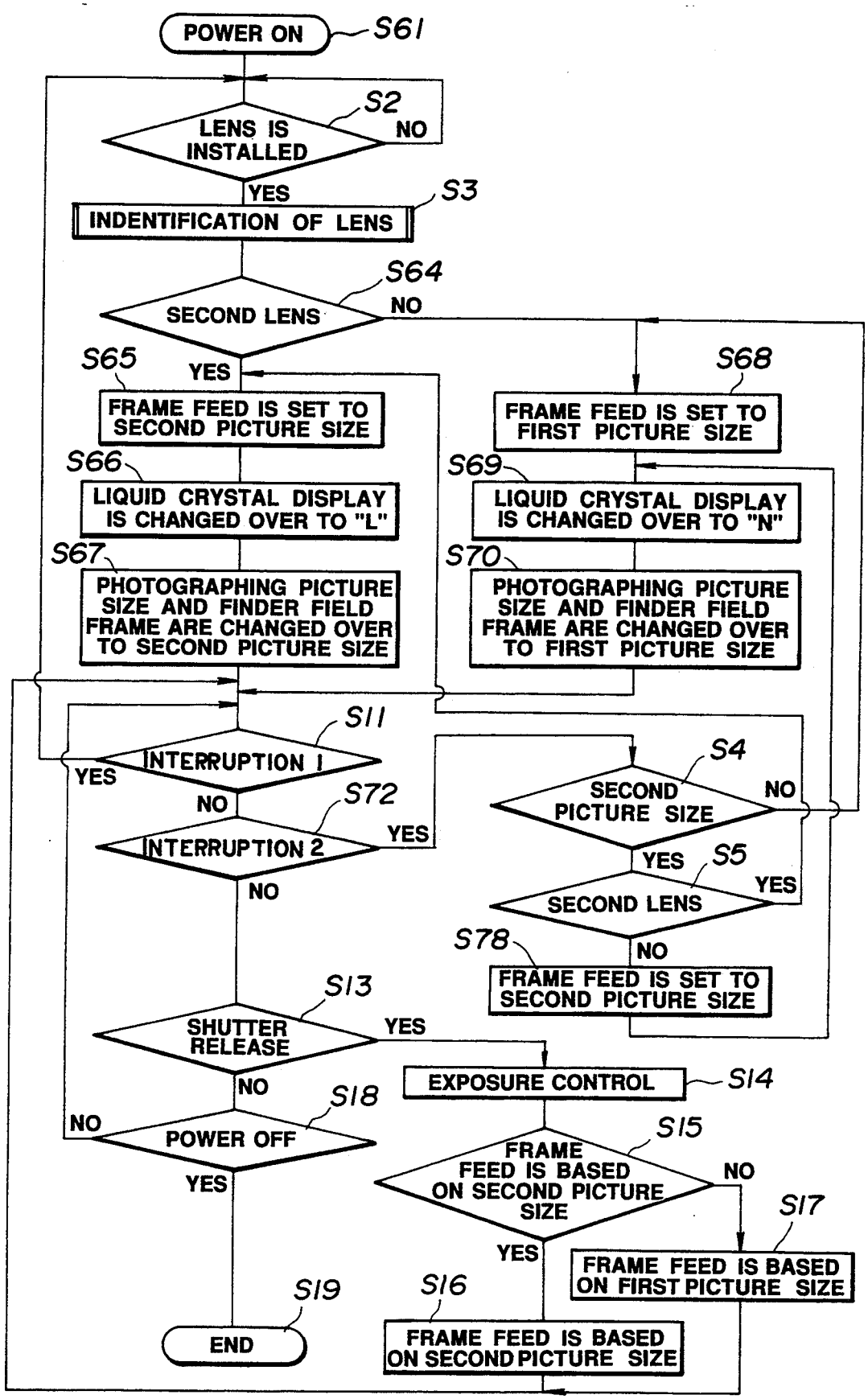
FIG. 12 is a flowchart showing the operations of the camera in a third embodiment of the present invention.

FIG. 12 is a flowchart of the operations of the camera when identifying the type of the photographing lens installed in the camera body and the photographing picture size mode in the camera in a third embodiment of the present invention.

A construction of the camera in accordance with this third embodiment is the same as that in the second embodiment. The operations of the camera are the same as those in the first and second embodiments except that only the operation to identify the type of the photographing lens installed in the camera body and the photographing picture size mode is different.

In accordance with this third embodiment, initially, whether or not the installed photographing lens is identical with the second lens is judged (step S64) after turning ON the power supply (step S61). If the installed photographing lens is identical with the second lens, a film feed quantity is set to the second picture size (step S65). An indication on the liquid crystal display unit 38 (see FIG. 7A) is changed over to "L" (step S66). A photographing size and a finder field frame are switched over to the second picture size (step S67).

In step S64 described above, if the installed photographing lens is not identical with the second lens, the film feed quantity is set to the first picture size (step S68). The indication on the liquid crystal display unit 38 is switched over to "N" (step S69). The photographing picture size and the finder field frame are changed over to the first picture size (step S70).

At this moment, when depressing the photographing picture size changeover switch 34a, the photographing picture size mode is changed over, and processing of an interruption 2 (step S72) is executed. Then, the operation goes back to step S68, if the photographing picture size is not the second picture size. When set to the second picture size, and if the second lens is installed, the operation returns to step S65. Further, when set to the second picture size, and if the first lens is installed, the film feed quantity is set to the second picture size (step S78). Thereafter, the operation goes back to step S69. Other operations are the same as those in the first embodiment.

According to the camera in the third embodiment, when the first lens is installed, even if the second picture size is selected, the indication on the liquid crystal display unit 38 becomes "N". It is therefore possible to inform the photographer of the fact that the photographing based on the second picture size is inhibited.

In this invention, it is apparent that working modes different in a wide range can be formed on this basis of this invention without departing from the spirit and scope of the invention. This invention is not restricted by any specific embodiment except as limited by the appended claims.

What is claimed is:

1. A camera loaded selectively with one of a first film having perforations formed in side edges and a second film having the same width as that of said first film and no perforations formed in side edges, said camera comprising:
   a picture size changeover means for selectively setting a photographing picture frame to a first picture size corresponding to said first film and a second picture size corresponding to said second film;
   a first lens installable and removable in and from said camera and having an image circle corresponding to said first picture size;
   a second lens installable and removable in and from said camera and having an image circle corresponding to said second picture size; and
   a means for judging which lens, said first lens or said second lens, is installed in said camera,
   whereby when said judging means judges that said first lens is installed in a state where said picture size changeover means is set to said second picture size, said picture size is so set as to be forcibly changed over to said first picture size.

2. A camera loaded selectively with one of a first film having perforations formed in side edges and a second film having the same width as that of said first film and no perforations formed in side edges, said camera comprising:
   a picture size changeover means for selectively setting a photographing picture frame to a first picture size corresponding to said first film and a second picture size corresponding to said second film;
   a first lens installable and removable in and from said camera and having an image circle corresponding to said first picture size;
   a second lens installable and removable in and from said camera and having an image circle corresponding to said second picture size;
   a means for judging which lens, said first lens or said second lens, is installed in said camera; and
   a display means for displaying which size, said first picture size or said second picture size, is selected,
   whereby when said judging means judges that said first lens is installed in a state where said picture size changeover means is set to said second picture size, said picture size is so set as to be forcibly changed over to said first picture size.

3. A camera loaded selectively with one of a first film having perforations formed in side edges and a second film having the same width as that of said first film and no perforations formed in side edges, said camera comprising:
   a picture size changeover means for selectively setting a photographing picture frame to a first picture size corresponding to said first film and a second picture size corresponding to said second film;
   a first lens installable and removable in and from said camera and having an image circle corresponding to said first picture size;
   a second lens installable and removable in and from said camera and having an image circle corresponding to said second picture size;
   a means for judging which lens, said first lens or said second lens, is installed in said camera; and
   a display means for displaying which size, said first picture size or said second picture size, is selected,
   whereby when said judging means judges that said second lens is not installed in a state where said picture size changeover means is set to said second picture size, said picture size is so set as to be forcibly changed over to said first picture size.

4. The camera according to claim 3, wherein said displaying means flashes an indication when said photographing picture frame is forcibly changed over to said first picture size.

5. A camera loaded selectively with one of a first film having perforations formed in side edges and a second film having the same width as that of said first film and no perforations formed in side edges, said camera comprising:
   a picture size changeover means for selectively setting a photographing picture frame to a first picture size corresponding to said first film and a second picture size corresponding to said second film;
   a first lens installable and removable in and from said camera and having an image circle corresponding to said first picture size;
   a second lens installable and removable in and from said camera and having an image circle corresponding to said second picture size;

a means for judging which lens, said first lens or said second lens, is installed in said camera; and a film feeding means in which a film feed quantity per frame is set to a first feed quantity corresponding to said first picture size and a second feed quantity corresponding to said second picture size, whereby when said judging means judges that said second lens is not installed in a state where said picture size changeover means is set to said second picture size, said film feeding means sets the feed quantity to said first feed quantity responsive to said judging means, and said picture size is so set as to be forcibly changed over to said first picture size.

6. A camera loaded selectively with one of a first film having perforations formed in side edges and a second film having the same width as that of said first film and no perforations formed in side edges, said camera comprising:

a picture size changeover means for selectively setting a photographing picture frame to a first picture size corresponding to said first film and a second picture size corresponding to said second film;

a finder field frame disposed in a finger light path and set selectively to one of a magnitude corresponding to said first picture size and a magnitude corresponding to said second picture size;

a first lens installable and removable in and from said camera and having an image circle corresponding to said first picture size;

a second lens installable and removable in and from said camera and having an image circle corresponding to said second picture size;

a means for judging which lens, said first lens or said second lens, is installed in said camera; and a film feeding means in which a film feed quantity per frame is set to a first feed quantity corresponding to said first picture size and a second feed quantity corresponding to said second picture size, whereby when said judging means judges that said second lens is not installed in a state where said pictures size changeover means is set to said second picture size, said film feeding means is set to said first feed quantity, the picture size is so set as to be forcibly changed over to said first picture size, and further said field frame is so set as to be forcibly changed over to a magnitude corresponding to said first picture size.

7. A camera loaded selectively with one of a first film having perforations formed in side edges and a second film having the same width as that of said first film and no perforations formed in side edges, said camera comprising:

a picture size changeover means for selectively setting a photographing picture frame to a first picture size corresponding to said first film and a second picture size corresponding to said second film;

a first lens installable and removable in and from said camera and having an image circle corresponding to said first picture size;

a second lens installable and removable in and from said camera and having an image circle corresponding to said second picture size;

a picture size judging means for judging whether or not the picture size changeover means is set to said second picture size;

a displaying means for displaying which picture size, said first picture size or said second picture size, is selected;

an installed lens judging means for judging whether or not said second lens is installed, whereby an indication on said displaying means is changed over in accordance with an output of said picture size judging means, and a setting state of the picture size changeover means is changed over in accordance with an output of said installed lens judging means.

8. A camera in which a first lens and a second lens having an image circle larger than that of said first lens are installable, said camera comprising:

a picture size changeover means for changing over a picture size for defining a range in which a subject image is photographed on a film surface to a first picture size corresponding to the image circle of said first lens and to a second picture size larger than said first picture size and corresponding to the image circle of said second lens; and an installed lens judging means for judging which lens of said two types of lenses is installed in said camera, whereby if the picture size is the said second picture size, and when said installed lens judging means detects that said first lens is installed, the picture size changeover means is set to said first picture size.

9. A camera in which a first lens having an image circle and a second lens having an image circle larger than that of said first lens are installable, said camera comprising:

a picture size changeover means for changing over a picture size for defining a range in which a subject image is photographed on a film surface to a first picture size corresponding to the image circle of said first lens and to a second picture size larger than said first picture size and corresponding to the image circle of said second lens; and an installed lens judging means for judging which of said first and second lenses is installed in said camera, whereby said changeover means forcibly changes over the picture size to said first picture size responsive to said judging means detects detecting that said first lens is installed even in a state where the picture size changeover means is set to said second picture size.

10. A camera comprising:

a changeover means for changing over a size of a picture frame for defining a range in which a subject image is photographed on a film surface to one of at least two different sizes;

at least two types of lenses having magnitudes of image circles, the magnitudes of which differ from one another and further respectively correspond to one of said picture frame sizes; and a displaying means operating responsive to an output of said changeover means and to the type of lens mounted upon the camera to display information indicating the frame size.

11. A camera body in which one of a first type of interchangeable lens having an image circle and a second type of interchangeable lens having an image circle larger than that of said first type of interchangeable lens are installable, said camera body comprising:

a picture size setting means for selectively changing over a picture size on a film surface to one of a first picture size corresponding to said first type of interchangeable lens and a second picture size corresponding to said second type of interchangeable lens;

a means for judging a type of said installed photographing lens; and an instructing means for instructing a changeover of the picture size to said picture size setting means responsive to a judged result of said judging means.

12. The camera body according to claim 11, wherein said instructing means includes a manually operable instructing means for instructing a changeover of the picture size in response to a manual operation.

13. The camera body according to claim 11, wherein said instructing means includes a manual changeover member and means for instructing the picture setting means to select said first picture size irrespective of a state of said manual changeover member when said judging means judges that said installed interchangeable lens is identical with said first type of interchangeable lens.

14. The camera body according to claim 12, wherein said instructing means includes a means for making invalid the operation of said manually operable instructing means when said installed interchangeable lens is identical with said first type of interchangeable lens.

15. The camera body according to claim 11, further comprising a means for changing over a finder field range, corresponding to said first and second picture sizes, in responsive to an instructive output of said instructing means.

16. A photographing lens installable to a camera in which a picture size on a film surface is varied in accordance with a diameter of an image circle of said photographing lens, comprising:

signal terminals for effecting communications with said camera;

a means for storing an identifying signal corresponding to said image circle diameter; and a means for transmitting said identifying signal stored in said memory means to said camera via said signal terminals responsive to a request signal from said camera via said signal terminals.

17. A camera system comprising:

a camera body having a picture size setting means for defining a size range in which a subject is photographed on a film surface; and an interchangeable lens installable in said camera body, said interchangeable lens including:

a means for storing information corresponding to an image circle diameter; and a means for transmitting said information to said camera body in accordance with a request signal from said camera body, said camera body including:

a means for outputting said information request signal to said interchangeable lens;

a means for receiving said information transmitted from said interchangeable lens; and a means for controlling said picture size setting means on the basis of said information.

18. The camera system according to claim 17, wherein said camera body further includes a means for manually instructing a changeover of the picture size and a means for changing over the picture size in accordance with the manual operation of said manual instructing means.

19. A camera system comprising:

a camera body; and a plurality of interchangeable lenses installable in said camera body, said plurality of interchangeable lenses each including a means for transmitting a signal representing an image circle diameter of the lens to said camera body, means for changing picture size, and said camera body including a means for prescribing the picture size on said film surface on the basis of said information about the image circle diameter of said installed interchangeable lens and operating said means for changing picture size.

20. The camera of claim 4 wherein said display means includes means for displaying indicia representing the second picture size when the photographing picture frame is changed over to said first picture size.

21. A camera comprising:

a changeover means for changing over a size of a picture frame for defining a range in which a subject image is photographed on a film surface to one of at least two different sizes;

at least two types of lenses having magnitudes of image circles, the magnitudes of which differ from one another and further respectively correspond to one of said picture frame sizes;

a displaying means operating responsive to an output of said changeover means and to the type of lens mounted upon the camera to display information indicating the frame size; and said displaying means generating a flashing display whenever the mounted lens type corresponds to a film size different from the setting of the size of film surface.

22. The camera of claim 20 wherein the display means generates a display showing the film size determined by the lens type mounted on the camera regardless of a size setting of the picture frame.

23. The camera of claim 11 wherein the instructing means includes means for instructing a changeover to the picture size associated with the lens installed on the camera, regardless of the setting of the picture size setting means.

24. A method for operating a camera having a picture frame switchable between a first size for accommodating a first film with perforations and a second size for accommodating a second film with no perforations and adaptable for releasably receiving one of a first type lens for use with the first film and a second type lens for use with the second film, each lens having a means for identifying lens type, comprising the steps of:

detecting the lens type mounted upon the camera by interrogating the identifying means when one of the lenses is mounted upon the camera; and setting the picture frame size according to the lens type identified regardless of the setting of the picture frame size and switching the picture frame size when it differs from the picture frame size corresponding to the lens type of the lens mounted on the camera.

25. A method for operating a camera having a picture frame switchable between a first size for accommodating a first film with perforations and a second size for accommodating a second film with no perforations and adaptable for releasably receiving one of a first type lens for use with the first film and a second type lens for use with the second film, each lens having a means for identifying lens type, comprising the steps of:

detecting the lens type mounted upon the camera by interrogating the identifying means when one of the lenses is mounted upon the camera;

setting the picture frame size according to the lens type identified regardless of the setting of the picture frame size and switching the picture frame size when it differs from the picture frame size corresponding to the lens type of the lens mounted on the camera; and said camera further including display means for displaying indicia representative of the picture frame size, and further comprising the steps of:

setting the display to generate the indicia representing the picture frame size selected; and flashing the display indicia whenever the frame size of the lens mounted upon the camera differs from the setting of the picture frame size.

26. The method of claim 24 wherein the camera further includes means for changing picture frame size to one of said first film size and said second film size responsive to a manually operable member, said method further comprising the step of:

selecting the picture frame size according to the lens type mounted upon the camera regardless of the picture frame size selected by the manually operable member.

27. The camera body according to claim 12 wherein a film installed in said camera is of a length sufficient to produce a plurality of photographic exposures and said manually operable instructing means further includes means capable of instructing a changeover of the picture size preparatory to each photographing operation.

28. A camera according to claim 10 wherein said changeover means includes moving means for changing over the picture size, which moving means operates in a manner which does not interfere with operation of either a film or a lens installed in said camera.

29. The method of claim 26 wherein said second lens type is capable of being used with said first film as well as said second film, said step of setting the picture frame size further comprising the step of:

selecting said first frame size whenever the identified lens type indicates that the first type lens is installed on the camera regardless of the position of the manually operable member and permitting the picture frame size selected by the manually operable member when the first type lens is installed on the camera regardless of the picture size selected by the manually operable member.

30. The method of claim 26 further comprising the step of:

memorizing the last picture frame size utilized during the last photographing operation; and changing the picture frame size when said manually operable member selects a picture frame size different from that memorized and when the lens type installed on the camera is proper for use with the selected picture frame size.

* * * * *